United States Patent
Johnson et al.

(10) Patent No.: US 11,715,184 B2
(45) Date of Patent: Aug. 1, 2023

(54) BACKWARDS-COMPATIBLE HIGH DYNAMIC RANGE (HDR) IMAGES

(71) Applicant: Apple Inc., Cupertino, CA (US)

(72) Inventors: Garrett M. Johnson, San Francisco, CA (US); Paul M Hubel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 17/029,800

(22) Filed: Sep. 23, 2020

(65) Prior Publication Data

US 2022/0092749 A1    Mar. 24, 2022

(51) Int. Cl.
| | |
|---|---|
| *H04N 23/70* | (2023.01) |
| *G06T 5/00* | (2006.01) |
| *G06T 3/40* | (2006.01) |
| *G06T 5/50* | (2006.01) |
| *H04N 23/741* | (2023.01) |

(52) U.S. Cl.
CPC .............. *G06T 5/009* (2013.01); *G06T 3/40* (2013.01); *G06T 5/50* (2013.01); *H04N 23/741* (2023.01); *G06T 2207/10016* (2013.01); *G06T 2207/20208* (2013.01)

(58) Field of Classification Search
CPC .. H04N 5/2355; H04N 5/2351; H04N 5/2356; H04N 5/23219; H04N 5/243; H04N 23/741; H04N 23/611; H04N 23/71; H04N 23/743; H04N 23/76; H04N 25/53; H04N 25/57; G06T 3/40; G06T 5/50; G06T 5/009; G06T 2207/10016; G06T 2207/10144; G06T 2207/20208; G06T 2207/20212

See application file for complete search history.

(56) References Cited

U.S. PATENT DOCUMENTS

| | | | |
|---|---|---|---|
| 11,189,017 B1* | 11/2021 | Baqai | ........... H04N 5/2356 |
| 2011/0188744 A1 | 8/2011 | Sun | |
| 2013/0176458 A1* | 7/2013 | Van Dalen | ........... H04N 5/2356 348/231.99 |
| 2016/0360212 A1 | 12/2016 | Dai | |
| 2016/0371823 A1* | 12/2016 | Kimura | ........... G06T 5/008 |
| 2018/0152684 A1 | 5/2018 | Wozniak | |
| 2018/0350047 A1 | 12/2018 | Baar | |
| 2019/0370948 A1* | 12/2019 | Tico | ........... H04N 5/2355 |

\* cited by examiner

*Primary Examiner* — Kelly L Jerabek
(74) *Attorney, Agent, or Firm* — Blank Rome LLP (57) ABSTRACT

Devices, methods, and program storage devices for creating and/or displaying backwards-compatible High Dynamic Range (HDR) images are disclosed, comprising: obtaining two or more exposures of a scene; creating a gain map based on at least one of the two or more exposures, wherein the gain map comprises a plurality of pixels each corresponding to a portion of the scene, and wherein values of the pixels in the gain map comprise indications of a brightness level of the corresponding portions of the scene; combining the two or more exposures to form a first image; tone mapping the first image based on a Standard Dynamic Range (SDR) format to generate a first SDR image of the scene; and storing the first SDR image and created gain map in a first enhanced image file. The first enhanced image file may be, e.g., a HEIF, HEIC, PNG, GIF, JPEG, or other suitable file format.

19 Claims, 5 Drawing Sheets

BACKWARDS-COMPATIBLE HIGH DYNAMIC RANGE (HDR) IMAGES

TECHNICAL FIELD

This disclosure relates generally to the field of digital image processing. More particularly, but not by way of limitation, it relates to techniques for creating and displaying backwards-compatible high dynamic range (HDR) images.

BACKGROUND

Traditional HDR photography techniques have evolved and improved to handle capturing and displaying the huge dynamic range of the real world, with the limited dynamic ranges available in typical imaging sensors and display devices. This has often been done by capturing multiple so-called "brackets" of images, i.e., images with different exposure times (also called "stops"), fusing those multiple brackets together into a single image, and then applying some form of "tone mapping" operation to bring the fused image into the dynamic range of a typical display. In the case of a standard dynamic range (SDR) display, the resulting image is generally stored as an 8-bit image, giving a final dynamic range for the image of approximately 250:1.

As display technology continues to improve, there are now displays capable of producing dynamic ranges much higher than the aforementioned 250:1 range. The movie and video industry's ecosystem has evolved to take advantage of these HDR displays by creating a variety of competing HDR video file formats that can be handled by a wide variety of displays. However, digital still image photography does not yet have this ubiquitous HDR eco-system.

Thus, it may be beneficial to provide devices, methods, and non-transitory program storage devices (NPSDs) that enable the capture, storage, and display of HDR digital still images in an enhanced image file format, which is both compatible with existing SDR image display workflows and also seamlessly allows for the image to be displayed with its full range of vibrant HDR content on "smart" or "aware" HDR displays.

SUMMARY

According to some embodiments described herein, at image capture time, for most HDR scenes, an image capture device may capture at least three brackets, which are often referred to as "EV0," "EV−" and "EV+" (which terms will be defined in greater detail below). Generally, the EV0 image corresponding to a "normal" or "ideal" exposure setting for the scene; the EV− image corresponds to an under-exposed (e.g., 4× darker) image of the scene; and the EV+ image corresponds to an over-exposed (e.g., 4× brighter) image of the scene. The EV0 image is also sometimes referred to as the "auto exposure" capture for the scene, and has optimal settings, as determined by the capabilities of the image sensor of the image capture device being used to capture the scene.

If certain pixels in the EV− image (e.g., an image expected to be 4× darker, on average, than the EV0 image, in the case of an EV− image underexposed by 2 exposure "stops") are still bright, this is a strong indication that such pixels are actually very bright pixels in the real scene (such pixels are also referred to herein as "HDR pixels," as their intensity values may give the overall image a higher dynamic range than is capable of being displayed on a typical SDR display). This set of "still bright" pixels or "HDR pixels" in the EV− image may be used to produce a "gain map" of all the pixels in the image that are likely to be indicative of true HDR pixels. This gain map may then be thresholded and/or downscaled as desired for a given implementation, and then stored alongside or along with the final bracketed image of the scene (e.g., within a single, enhanced image file format), which final bracketed image may have itself been formed by fusing together two or more of the original bracketed captures, and also may have been tone-mapped as desired, e.g., for a typical SDR display. For example, in the modern HEIF/HEIC file formats, this gain map may be stored as an "aux" image along with the final bracketed image of the scene. For JPEG file formats, the gain map may be stored, e.g., by appending the gain map to the end of the standard image data in the file structure.

At this point, the enhanced image file format could be shared to any user and/or any display device. If the display device where the enhanced image is ultimately to be displayed is not smart or aware of the presence of the gain map within the enhanced image file format, it will simply be displayed at the display device like any other SDR still image capture. If, however, the display device is smart or aware, i.e., does know about the presence of the gain map within the enhanced image file format and how to apply it, then the display device may take advantage of the gain map information, e.g., by querying the display to ask for an amount of available extended range headroom (i.e., the illumination range of the display device available above the "normal range" of traditional SDR displays, e.g., what is sometimes referred to as being above the brightness level of so-called "diffuse white," and which may also be dependent on ambient lighting conditions). Assuming there is available extended range headroom, the display device may then composite the final bracketed image, the gain map, and knowledge of the available extended range headroom of the display together to present a final enhanced image on the display that takes advantage of the available higher dynamic range of the display for those regions of the original captured scene that corresponded to the true HDR content in the scene as it was originally captured.

Thus, devices, methods, and NPSDs are disclosed herein to provide for the creation and display of backwards-compatible HDR images. According to some embodiments, there is provided a method for digital image processing, comprising: obtaining two or more exposures of a scene captured by one or more image capture devices; creating a gain map based on at least one of the two or more exposures, wherein the gain map comprises a plurality of pixels each corresponding to a portion of the scene, and wherein values of the pixels in the gain map comprise indications of a brightness level of the corresponding portions of the scene; combining the two or more exposures to form a first image; tone mapping the first image based on a first SDR format to generate a first SDR image of the scene; and storing the first SDR image and created gain map in a first enhanced image file. According to some such embodiments, the first enhanced image file may comprise one of: a HEIF file; a HEIC file; a PNG file; a GIF file; or a JPEG file.

According to some such embodiments, a first exposure of the two or more exposures comprises an EV0 image. According to other embodiments, a second exposure of the two or more exposures comprises an EV− image that is underexposed relative to the EV0 image. According to still other embodiments, the EV− image is already registered with the EV0 image when they are obtained. According to still other embodiments, the first image comprises an HDR image. According to still other embodiments, a third exposure of the two or more exposures comprises an EV+ image that is overexposed relative to the EV0 image.

According to other such embodiments, creating the gain map further comprises creating a gain map having a lower resolution than the first image, e.g., a resolution that is one fourth or less of the resolution of the first image. According to other embodiments, pixel values in the gain map at or below a predetermined noise threshold value may be set to zero.

According to still other such embodiments, the created gain map may be applied to the first SDR image to create a second enhanced image, wherein the second enhanced image has a higher dynamic range than the first SDR image. According to other embodiments, the second enhanced image may be displayed on the display device. According to still other embodiments, the method may further determine an amount of available headroom at the display device and apply the created gain map to the first SDR image to create a second enhanced image based, at least in part, on the determined amount of available headroom. According to still other embodiments, a value representative of the pixels in the created gain map (e.g., an average value) may be determined, and then the determined amount of available headroom may be modulated, e.g., based on the determined value representative of the pixels in the created gain map.

In other embodiments, applying the created gain map to the first SDR image to create a second enhanced image may further comprise determining whether there is a face present in the first image, and then applying the created gain map to the first SDR image to create a second enhanced image further based, at least in part, on the determination of whether there is a face present in the first image.

According to yet other embodiments, there is provided a method for digital image processing, comprising: obtaining a first enhanced image file, wherein the first enhanced image file comprises a tone mapped first SDR image of a scene and a gain map corresponding to the scene; determining an amount of available headroom at a display device wherein the first SDR image is to be displayed; determining a value representative of the pixels in the gain map; modulating the determined amount of available headroom based on the determined value representative of the pixels in the gain map; applying the gain map to the first SDR image to create a second enhanced image based, at least in part, on the determined amount of available headroom and the determined value representative of the pixels in the gain map; and causing the second enhanced image to be displayed at the display device.

Various NPSD embodiments are also disclosed herein. Such NPSDs are readable by one or more processors. Instructions may be stored on the NPSDs for causing the one or more processors to perform any of the digital image processing techniques for creating and/or displaying backwards-compatible high dynamic range (HDR) images disclosed herein.

Various programmable electronic devices are also disclosed herein, in accordance with the NPSD and method embodiments enumerated above. Such electronic devices may include one or more image capture devices, such as optical image sensors/camera units; a display; a user interface; one or more processors; and/or a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Definitions

Discussion will now turn to the nomenclature that will be used herein to refer to the various differently-exposed images that may be captured by an image capture device. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

According to some embodiments, in order to recover a desired amount of shadow detail in the captured image, some degree of overexposure (e.g., EV+2) may also intentionally be employed in bright scenes and scenes with medium brightness. To keep brightness levels consistent across the various captured images, the gain may be decreased proportionally as the exposure time of the capture is increased, as, according to some embodiments, brightness may be defined as the product of gain and exposure time. According to some embodiments, even images captured as EV0 images may still be modified in one or more ways, as may be desired by a given implementation, e.g., in terms of gain and exposure time combinations.

In some embodiments, the particular exposure time (and/or gain) of an image captured may be further based, at least in part, on ambient light levels around the image capture device(s), with brighter ambient conditions allowing for comparatively shorter image exposure times, and with darker ambient conditions allowing the use of comparatively longer image exposure times. In still other embodiments, the particular exposure time (and/or system gain) of a particular image may be further based, at least in part, on whether the image capture device is using an OIS system during the capture operation.

Exemplary Backwards-Compatible HDR Image Creation and Display Workflows

Figure 1:
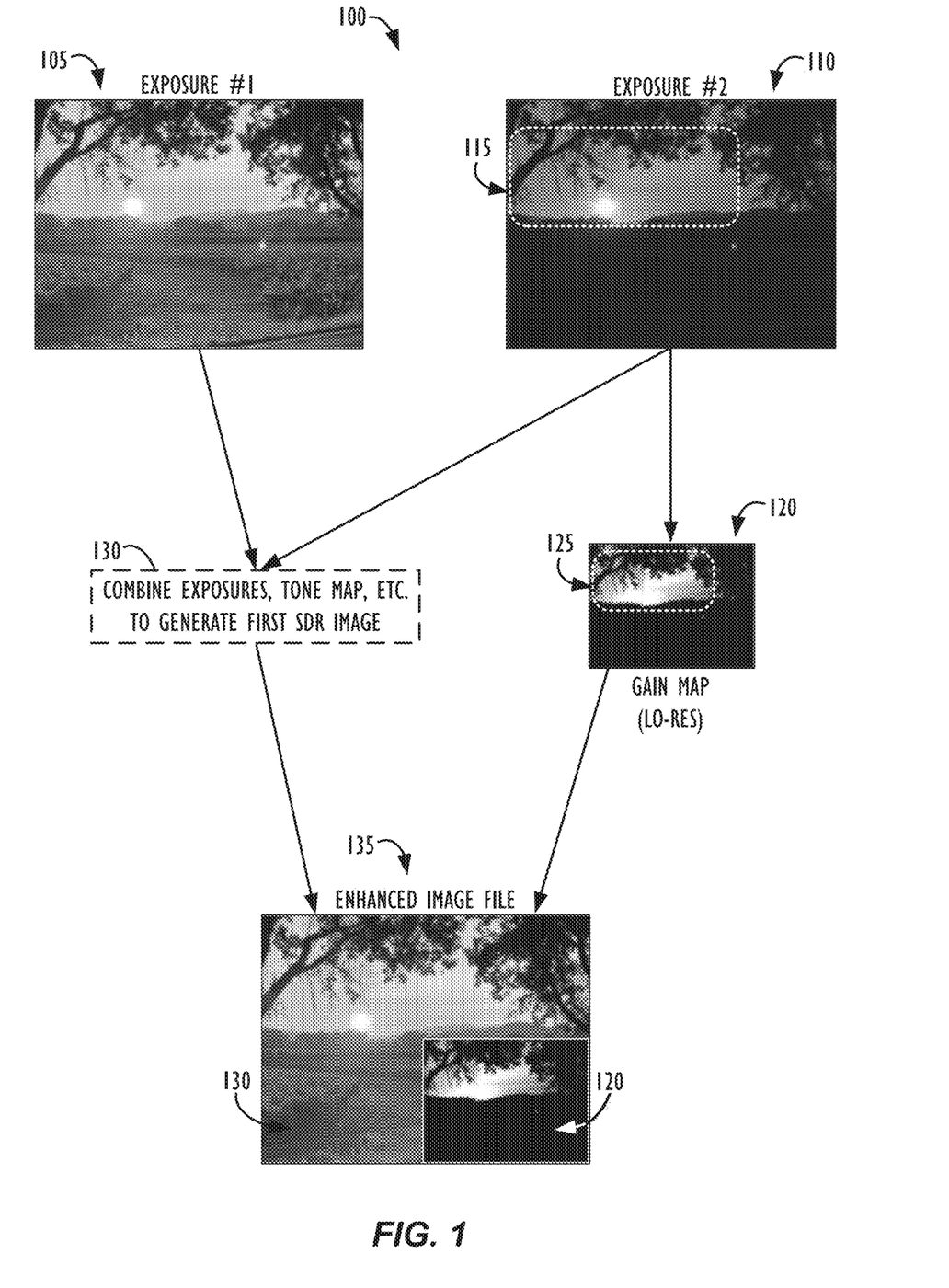
FIG. 1 illustrates an enhanced image creation workflow, according to one or more embodiments.

Turning now to FIG. 1, an enhanced image creation workflow 100 is shown, according to one or more embodiments. Exposure #1 (105) may represent a first exposure of a captured scene, such as an EV0 or "auto-exposed" image. Exposure #2 (110) may represent a second exposure of the captured scene, such as an EV− or "under-exposed" image. In some embodiments, it may be preferential for the two exposures to be as closely synchronized in capture time to one another as possible, so as to make image registration (i.e., the finding of correspondences between the exposures) as reliable and error-free as possible. In some preferred embodiments, the exposure may even arrive from an image sensor in a pre-registered fashion, i.e., they may already be registered (e.g., by sensor hardware) before any image processing firmware or software performs further image processing operations, such as fusion, tone mapping, or the like.

In the example of FIG. 1, wherein Exposure #2 (110) represents an EV− image that is under-exposed relative to the EV0 image (e.g., by a factor of 2× darker, 4× darker, 8× darker, etc.), regions in the EV− image that remain bright (e.g., as defined by one or more luminance or intensity thresholds) are likely to be indicative of portions of the originally captured scene that actually represent "true" HDR content. For example, in Exposure #2 (110), the pixels inside region of 115 remain bright, even after intentionally being "stopped down" and underexposed in the EV− image.

In some embodiments, as illustrated at block 130, the two or more exposures may be combined (e.g., fused) to form a first image. In some cases, the first image may be tone mapped, e.g., for a typical SDR display to generate a first SDR image. It is to be understood that the use of one EV0 and one EV− exposure in the example of FIG. 1 is merely illustrative, and that other kinds and numbers of image exposures may also be used in a given implementation. For example, below certain scene lux levels, capturing an EV− image may not provide any usable or helpful image information, and thus may not be captured. In such situations, the image capture device(s) may instead determine to take a plurality of EV0 images and then fuse those EV0 images together, before applying some amount of digital gain or tone mapping to some (or all) of the range of the fused image signal.

In some embodiments, a gain map 120 may be created based on at least one of the two or more exposures (in the example of FIG. 1, the gain map is based on the values of pixels in Exposure #2 (110)). Gain map 120 may comprise a plurality of pixels, wherein each pixel corresponds to some portion of the captured scene, and wherein values of the pixels in the gain map comprise indications of a brightness level of the corresponding portions of the scene (e.g., higher values in the gain map represent portions of the original captured scene that were brighter, and lower values in the gain map represent portions of the original captured scene that were darker). For example, the gain map 120 pixel values for portions of the captured scene corresponding to the aforementioned bright pixels inside region 115 of Exposure #2 (110) remain high in gain map 120 (as indicated by the brighter pixel values in corresponding region 125 of gain map 120), which will result in these pixels actually being "boosted" by the largest amount if or when the enhanced image file is to be displayed on an aware HDR display, as will be explained in further detail below.

It is to be understood that, in some implementations, the gain map may be a single image plane, e.g., relating to the overall brightness/luminance values of pixels, while, in other implementations, multiple gain map image planes may be stored in an enhanced image file, e.g., a separate gain map for each primary color channel. In some cases, for purposes of memory efficiency, it may also be preferable to create and store the gain map 120 at a lower resolution than the first SDR image and/or to compress the information stored in gain map 120 before storage. For example, in some implementations, the lower resolution gain map 120 may comprise dimensions that are each downscaled to half of the magnitude of the dimensions of the first SDR image, thus resulting in a resolution that is one fourth of the first SDR image. It is to be understood that other resolutions are possible for the lower resolution gain map 120, e.g., ½ resolution of the first SDR image, ⅛ resolution of the first SDR image, 1/16 resolution of the first SDR image, etc. It is also possible to not create a lower resolution gain map, e.g., by creating a gain map with the same resolution of the first SDR image.

In some embodiments, as illustrated by enhanced image file 135, the first SDR image from block 130 may be stored alongside or along with lower resolution gain map 120 (e.g., at specified portions of the same image file). As will be explained in greater detail herein, enhanced image file 135 provides for a backwards-compatible HDR digital still image that may be displayed on current "unaware" SDR displays using existing display pipelines and take advantage of the aforementioned fusion and/or tone mapping operations to present an optimal image for SDR display, while allowing "aware" HDR displays to access the information stored in lower resolution gain map 120, and using it to intelligently enhance the first SDR image 130, e.g., by leveraging available display brightness headroom to increase the brightness of those portions of the captured scene indicated in the gain map 120 as being indicative of true HDR scene content.

Figure 2:
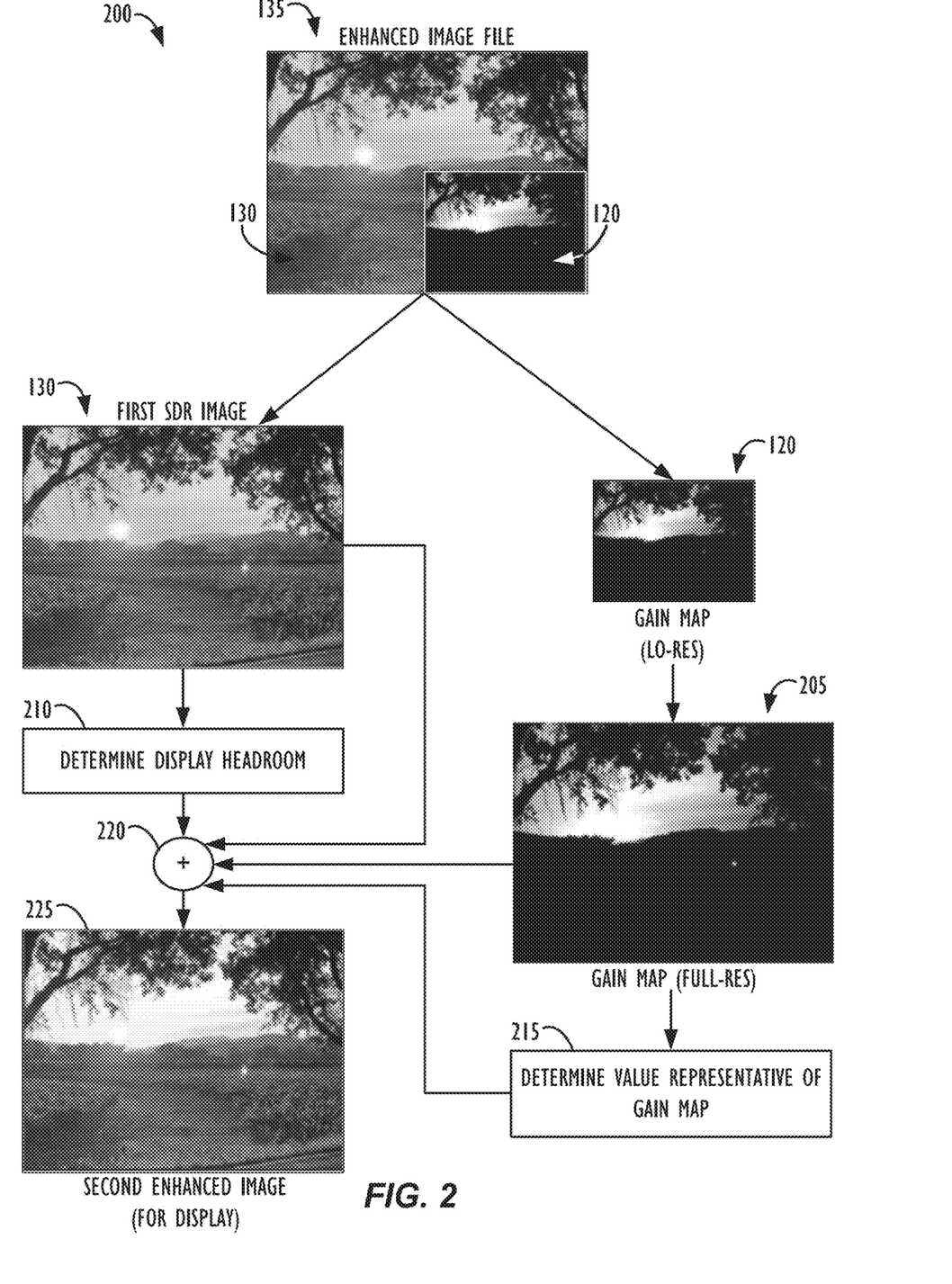
FIG. 2 illustrates an enhanced image display workflow, according to one or more embodiments.

Turning now to FIG. 2, an enhanced image display workflow 200 is shown, according to one or more embodiments. FIG. 2 assumes the workflow described above with reference to FIG. 1 has been carried out, i.e., wherein the enhanced image file 135 has been received and is ready to be displayed by an "aware" HDR display. Beginning with the enhanced image file 135 (created as described above, with reference to FIG. 1), the first SDR image 130 and lower resolution gain map 120 may be extracted from the enhanced image file 135. Next, lower resolution gain map 120 may be upscaled, e.g., to match the resolution of the first SDR image 130, in the form of full resolution gain map 205. In some embodiments, the full resolution gain map 205 may be modified or tuned in one or more ways, as desired. For example, pixel values in the gain map at or below a predetermined noise threshold value may be set to zero, so as to avoid the unintentional amplification of noise data in the final displayed enhanced image. In some embodiments, the gain map may be thresholded with a function, e.g., a smoothstep function, which may be used to "crush" the noise in the shadows while also boosting the highlights in the image a bit. In some embodiments, the gain map may also be encoded with a gamma function (e.g., sqrt or sRGB gamma functions). Additionally or alternatively, various morphological operations may be applied to the gain map if it is desirable to smooth the gain map data, e.g., so as to remove "islands" of outlier large values in the gain map and/or fill in "holes" of outlier lower values in the gain map, etc. Other operations may also be performed on the gain map if desired, e.g., operations based upon other semantic features, such as using a person segmentation mask to ensure human subjects are boosted by a desired amount (e.g., possibly more or less than would otherwise be indicated in the gain map).

Concurrently, or prior, the display device (i.e., the computing device possessing or in communication with the aforementioned "aware" HDR display) may determine the amount of available headroom for display of the first SDR image. A typical SDR display may be said to have what is known as "normal range" of display, e.g., corresponding to pixel bit values of 0 to 255, or a normalized range of 0.0 to 1.0, whereas the available headroom or "extended range headroom" of an HDR display, e.g., having some larger normalized range, such as 0.0 to 8.0, would allow certain regions of the image to extend, i.e., go brighter than, the normal range that SDR displays are capable of. Typically, the amount of "extended range headroom" available at a display is also a function of the current ambient illumination levels, e.g., with higher ambient illumination levels causing there to be less available extended range headroom to push the HDR content of an image into.

In some embodiments, at block 215, the workflow 200 may also determine a value (e.g., an average) representative of the pixels in the full resolution gain map 205. In some cases, the determined value representative of the pixels in full resolution gain map 205 may be used to modulate (e.g., alter in some way, based on the tuning preferences and/or desired look-and-feel of a given implementation) the amount of available headroom determined at block 210. For example, in some implementations, if the value representative of the pixels in the full resolution gain map 205 indicates there is a relatively high percentage of HDR pixels in the first enhanced image (e.g., via the gain map having a determined average value higher than a threshold value and/or more than a threshold percentage of image pixels of sufficient brightness, e.g., exceeding another threshold value, such as a normalized brightness value of 0.75 on a scale of 0 to 1, etc.), then it may be desirable to use less than all—or less than a typical amount—of the available headroom of the display device determined at block 210 for the display of the enhanced image file 135, as it may not be visually pleasing to have a large percentage of the pixels in the enhanced image be displayed as overly bright (even if such pixels were truly bright or "HDR pixels" in the scene as captured). For similar reasons, in some embodiments, it may also be desirable to modulate the amount of available headroom based on the size of the image ultimately being displayed (e.g., in terms of actual, "real-world" screen space that the displayed image encompasses). For example, it may be visually acceptable to use all available headroom when an HDR image is being displayed in a small square thumbnail on a mobile phone, but it may be unacceptably bright to use all available headroom when the same HDR image is displayed full screen on a 75" television display.

Finally, at block 220, the full resolution gain map 205 may be applied to the first SDR image 130 to create a second enhanced image 225 for display (i.e., an image having a higher dynamic range than the first SDR image) based, at least in part, on the determined amount of available headroom at block 210 (subject to any modulations, e.g., as caused by the value representative of the pixels in the gain map determined at block 215). In some embodiments, applying the full resolution gain map 205 to the first SDR image 130 to create a second enhanced image 225 for display may further comprise determining whether there is a face present in the first SDR image. For example, if a face is present, it may not be as desirable to use the entirety of available headroom, as overly bright human faces may have an unpleasant or unnatural appearance when displayed on an HDR display. Thus, according to some embodiments, the determined amount of available headroom to be used may be reduced, e.g., divided in half, for images in which faces are present. Moreover, as mentioned above, it is also possibly to modify the values stored in the gain map itself based upon the semantic understanding of the image content, e.g., the presence of faces.

In some embodiments, the value of a pixel in second enhanced image 225 may be determined according to the following equation:

$$\text{SecondEnhancedImageRGB} = \text{FirstSDRImageRGB} * (1.0 + (\text{ModulatedAvailableHeadrooom} - 1.0) * \text{GainMapValue}) \quad \text{(Eqn. 1)}.$$

In other words, for any pixel in the second enhanced image 225, workflow 200 may add anywhere from 0% of the additional available headroom to 100% of the additional available headroom, based on the corresponding gain map value (and subject to any desired modulations to the amount of available headroom the display is permitted to utilize at a given time). [In this example, the gain map is stored with values in a normalized range of 0 to 1.]

In some embodiments, only pixels in the first SDR image having values above a certain threshold (e.g., an 18% gray value) may be encoded into the extended range headroom available on a given HDR display (e.g., using a smoothstep function), while values below the certain threshold may be left unaltered. In still other embodiments, the entire image range of the first SDR image may be encoded into the extended range headroom available on a given HDR display, thus providing a smooth and natural look the displayed enhanced image.

According to some embodiments, it may also be desirable to be able to "transcode," i.e., convert, an enhanced image file back and forth between a "true" HDR format (e.g., a still image format with 10-bit, 12-bit, 16-bit color depth, etc.) and the "enhanced" backwards-compatible HDR image formats described herein, comprising a tone-mapped SDR image and corresponding gain map for usage by aware HDR displays.

Exemplary Methods for Creating and Displaying Backwards-Compatible HDR Images

Figure 3:
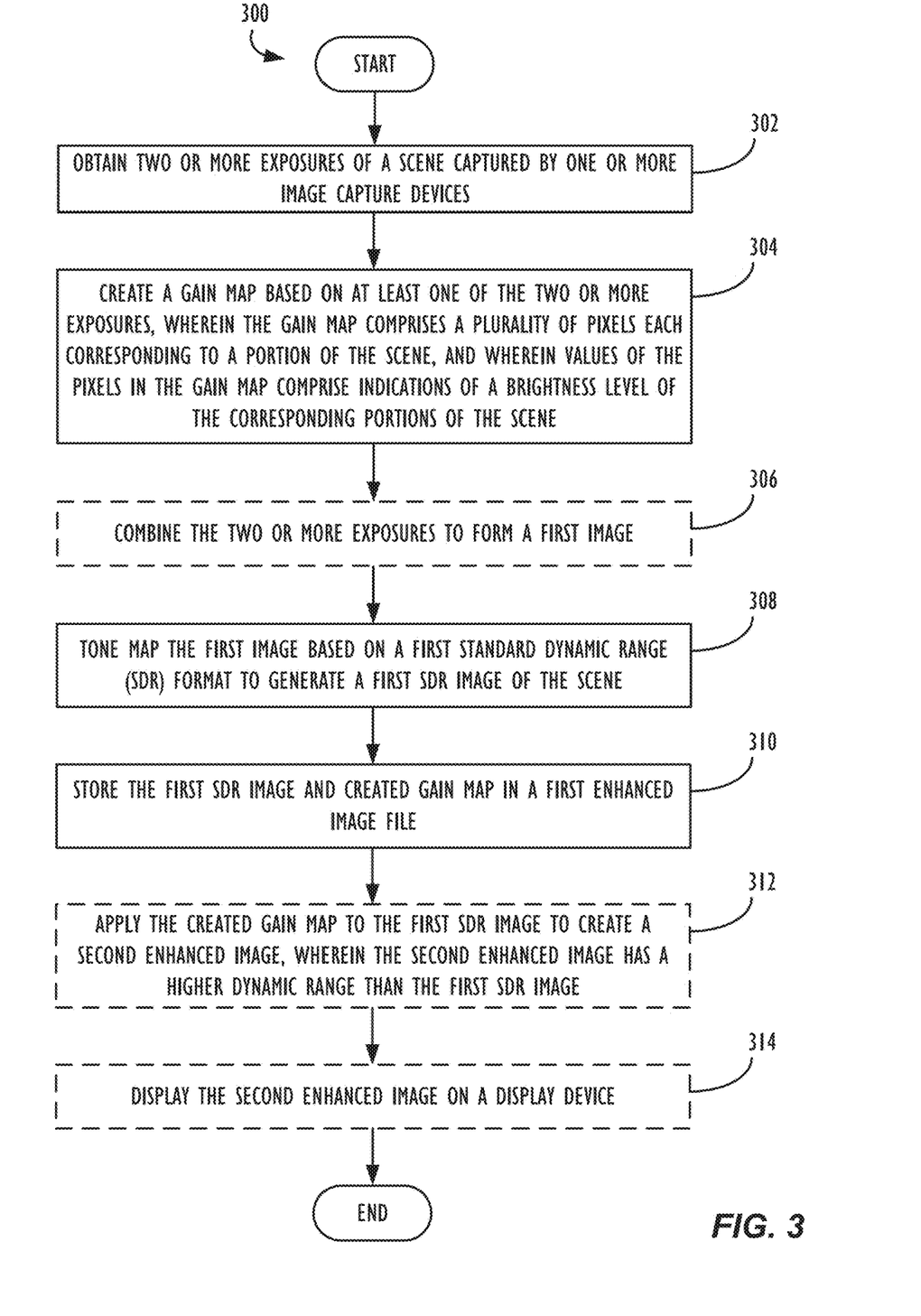
FIG. 3 is a flow chart illustrating a method of enhanced image creation, according to various embodiments.

Turning now to FIG. 3, a flow chart 300 illustrating a method of enhanced image creation is shown, according to various embodiments. First, at Step 302, the method 300 may obtain two or more exposures of a scene captured by one or more image capture devices. Next, at Step 304, the method 300 may create a gain map based on at least one of the two or more exposures, wherein the gain map comprises a plurality of pixels each corresponding to a portion of the scene, and wherein values of the pixels in the gain map comprise indications of a brightness level of the corresponding portions of the scene.

Next, at Step 306, the method 300 may combine the two or more exposures to form a first image, if desired (e.g., if combining two or more of the exposures would result in a higher quality final bracketed image than just using a single exposure, such as the EV0 exposure—which may not always be the case, depending on the scene composition and/or the exposure settings used by the image capture device(s)). At Step 308, the method 300 may tone map the first image based on a first SDR format (e.g., sRGB or P3) to generate a first SDR image of the scene. Finally, at Step 310, the method 300 may store the first SDR image and created gain map in a first enhanced image file. As mentioned above, in some embodiments, the first enhanced image file may comprise one of: a HEIF file; a HEIC file; a PNG file; a GIF file; or a JPEG file Optional Steps 312 and 314 are included in FIG. 3 to further show how the created enhanced image file might be leveraged by a smart or aware display device to produce a higher dynamic range version of the image content. In particular, at Step 312, the method 300 (assuming it is executing on an aware display device) may apply the created gain map to the first SDR image to create a second enhanced image, wherein the second enhanced image has a higher dynamic range than the first SDR image and then, at Step 314, display the second enhanced image on the aware display device.

Figure 4:
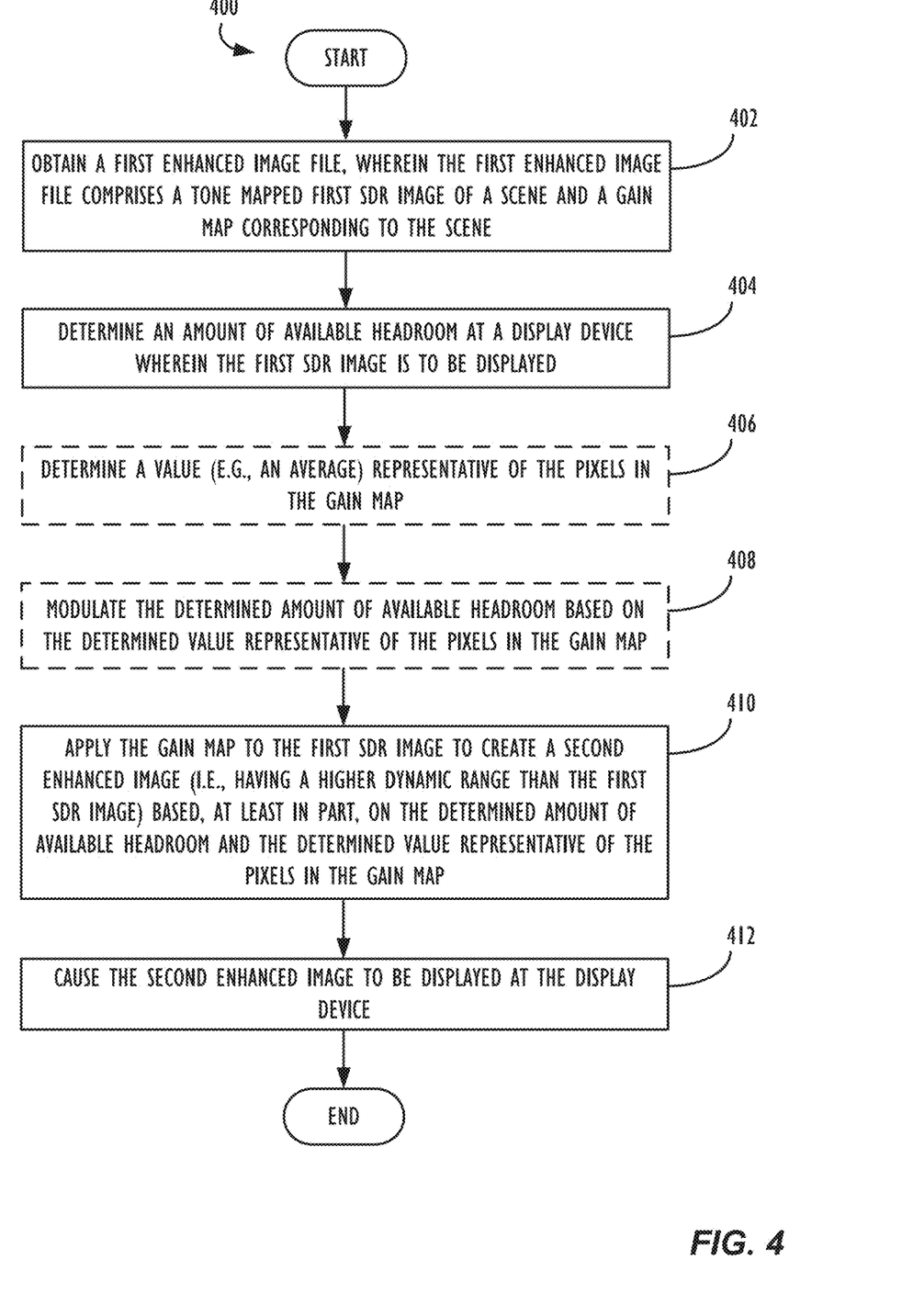
FIG. 4 is a flow chart illustrating a method of enhanced image display, according to various embodiments.

Turning now to FIG. 4, a flow chart 400 illustrating a method of enhanced image display is shown, according to various embodiments. First, at Step 402, the method 400 may obtain a first enhanced image file, wherein the first enhanced image file comprises a tone mapped first SDR image of a scene and a gain map corresponding to the scene. In some implementations, the values of the gain map may be made available to developers and/or calling applications via an Application Programming Interface (API). Next, at Step 404, the method 400 may determine an amount of available headroom at a display device wherein the first SDR image is to be displayed. Next, at Step 406, the method 400 may determine a value (e.g., an average) representative of the pixels in the gain map. Next, at Step 408, the method 400 may modulate the determined amount of available headroom based on the determined value representative of the pixels in the gain map, e.g., as described above with reference to FIG. 2.

Next, at Step 410, the method 400 may apply the gain map to the first SDR image to create a second enhanced image (i.e., having a higher dynamic range than the first SDR image) based, at least in part, on the determined amount of available headroom and the determined value representative of the pixels in the gain map. Finally, if desired or requested, e.g., by a user, at Step 412, the method 400 may cause the second enhanced image to be displayed at the display device.

While the techniques herein are described largely in the context of displaying SDR images with greater dynamic range on certain aware HDR displays, it is to be understood that these techniques could be applicable and beneficial, as applied to any application that would benefit from more accurate image capture-time "ground truth" knowledge of the location of true scene highlights in a captured image. For example, various photo editing tools, e.g., highlight editors or bokeh effect generators, may benefit from knowledge of the exact location, intensity, and color of true scene highlights, as opposed to making educated inferences based on scene luminance in a resulting tone-mapped image that is being edited.

(Note: The optionality of the performance of certain steps in FIGS. 3 and 4 is indicated by the use of dashed line boxes.)

Exemplary Electronic Computing Devices

Figure 5:
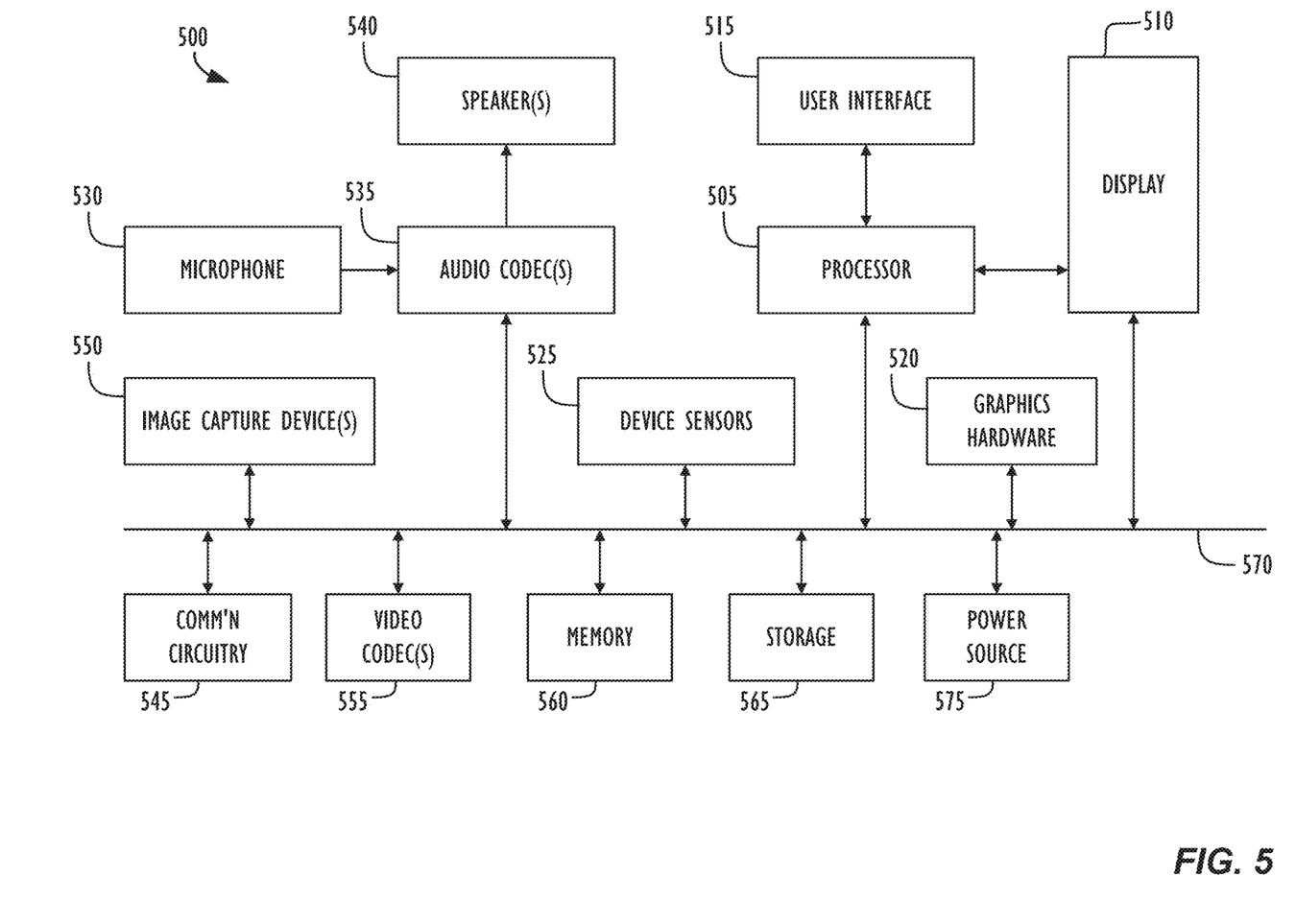
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be processed to generate higher dynamic range versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a display device;
   a memory; and
   one or more processors operatively coupled to the memory, wherein the one or more processors are configured to execute instructions causing the one or more processors to:
   obtain two or more exposures of a scene captured by one or more image capture devices;
   create a gain map based on at least one of the two or more exposures, wherein the gain map comprises a plurality of pixels each corresponding to a portion of the scene, and wherein values of the pixels in the gain map comprise indications of a brightness level of the corresponding portions of the scene;
   combine the two or more exposures to form a first image, wherein the gain map has a lower resolution than the first image;
   tone map the first image based on a first Standard Dynamic Range (SDR) format to generate a first SDR image of the scene; and
   store the first SDR image and created gain map in a first enhanced image file.

2. The device of claim 1, wherein a first exposure of the two or more exposures comprises an EV0 image.

3. The device of claim 2, wherein a second exposure of the two or more exposures comprises an EV- image that is underexposed relative to the EV0 image.

4. The device of claim 3, wherein the EV- image is registered with the EV0 image when they are obtained.

5. The device of claim 3, wherein the first image comprises a High Dynamic Range (HDR) image.

6. The device of claim 3, wherein a third exposure of the two or more exposures comprises an EV+ image that is overexposed relative to the EV0 image.

7. The device of claim 1, wherein the lower resolution of the gain map comprises a resolution that is one fourth or less of the resolution of the first image.

8. The device of claim 1, wherein the instructions causing the one or more processors to create a gain map further comprise instructions causing the one or more processors to:
   set pixel values in the gain map at or below a predetermined noise threshold value to zero.

9. The device of claim 1, wherein the first enhanced image file comprises one of: a HEIF file; a HEIC file; a PNG file; a GIF file; or a JPEG file.

10. The device of claim 1, wherein the one or more processors are further configured to execute instructions causing the one or more processors to:
    apply the created gain map to the first SDR image to create a second enhanced image, wherein the second enhanced image has a higher dynamic range than the first SDR image.

11. The device of claim 10, wherein the one or more processors are further configured to execute instructions causing the one or more processors to:
    display the second enhanced image on the display device.

12. The device of claim 10, wherein the instructions causing the one or more processors to apply the created gain map to the first SDR image to create a second enhanced image further comprise instructions causing the one or more processors to:
    determine an amount of available headroom at the display device; and apply the created gain map to the first SDR image to create a second enhanced image based, at least in part, on the determined amount of available headroom.

13. The device of claim 12, wherein the instructions causing the one or more processors to apply the created gain map to the first SDR image to create a second enhanced image further comprise instructions causing the one or more processors to:
   determine a value representative of the pixels in the created gain map; and
   modulate the determined amount of available headroom based on the determined value representative of the pixels in the created gain map.

14. The device of claim 10, wherein the instructions causing the one or more processors to apply the created gain map to the first SDR image to create a second enhanced image further comprise instructions causing the one or more processors to:
   determine whether there is a face present in the first image; and
   apply the created gain map to the first SDR image to create a second enhanced image based, at least in part, on the determination of whether there is a face present in the first image.

15. A non-transitory program storage device (NPSD) comprising computer readable instructions executable by one or more processors to:
   obtain two or more exposures of a scene captured by one or more image capture devices;
   create a gain map based on at least one of the two or more exposures, wherein the gain map comprises a plurality of pixels each corresponding to a portion of the scene, and wherein values of the pixels in the gain map comprise indications of a brightness level of the corresponding portions of the scene;
   combine the two or more exposures to form a first image, wherein the gain map has a lower resolution than the first image;
   tone map the first image based on a first Standard Dynamic Range (SDR) format to generate a first SDR image of the scene; and
   store the first SDR image and created gain map in a first enhanced image file.

16. The NPSD of claim 15, wherein the one or more processors are further configured to execute instructions causing the one or more processors to:
   apply the created gain map to the first SDR image to create a second enhanced image, wherein the second enhanced image has a higher dynamic range than the first SDR image; and
   store the second enhanced image in a memory.

17. The NPSD of claim 16, wherein the instructions causing the one or more processors to apply the created gain map to the first SDR image to create a second enhanced image further comprise instructions causing the one or more processors to:
   determine an amount of available headroom at a display device wherein the first SDR image is to be displayed;
   apply the created gain map to the first SDR image to create a second enhanced image based, at least in part, on the determined amount of available headroom; and
   cause the second enhanced image to be displayed at the display device.

18. The NPSD of claim 17, wherein the instructions causing the one or more processors to apply the created gain map to the first SDR image to create a second enhanced image further comprise instructions causing the one or more processors to:
   determine a value representative of the pixels in the created gain map; and
   modulate the determined amount of available headroom based on the determined value representative of the pixels in the created gain map.

19. A method, comprising:
   obtaining a first enhanced image file, wherein the first enhanced image file comprises a tone mapped first SDR image of a scene and a gain map corresponding to the scene, the gain map comprising a plurality of pixels, wherein the gain map has a lower resolution than the first SDR image;
   determining an amount of available headroom at a display device wherein the first SDR image is to be displayed;
   determining a value representative of the pixels in the gain map;
   modulating the determined amount of available headroom based on the determined value representative of the pixels in the gain map;
   applying the gain map to the first SDR image to create a second enhanced image based, at least in part, on the determined amount of available headroom and the determined value representative of the pixels in the gain map; and
   causing the second enhanced image to be displayed at the display device.

* * * * *